United States Patent
Tanaka et al.

[11] 4,157,211
[45] Jun. 5, 1979

[54] ZOOM LENS HAVING AN EASILY CHANGEABLE RANGE OF VARIABLE FOCAL DISTANCE

[75] Inventors: Kazuo Tanaka, Tokyo; Ryusho Hirose, Yokosuka, both of Japan

[73] Assignee: Canon Kabushiki Kaisha, Tokyo, Japan

[21] Appl. No.: 777,852

[22] Filed: Mar. 15, 1977

[30] Foreign Application Priority Data

Mar. 19, 1976 [JP] Japan .................. 51-30495

[51] Int. Cl.² .................. G02B 15/12; G02B 15/16
[52] U.S. Cl. ......................... 350/183; 350/184; 350/207
[58] Field of Search .................. 350/183, 184, 207

[56] References Cited
U.S. PATENT DOCUMENTS
4,015,895  4/1977  Hirose .................. 350/183

Primary Examiner—Paul A. Sacher
Attorney, Agent, or Firm—Toren, McGeady and Stanger

[57] ABSTRACT

A zoom lens having a lens part for focusing, a zooming part consisting of a plurality of movable lens groups to vary focal distance, and a lens part for imaging in the rear of the zoom lens. The lens part for imaging consists of a front group. A rear group and a variable magnification lens group can be mounted at and dismounted from a position between the front group and rear group. A range of variable focal distance can be easily changed by shifting a portion of lenses positioned closer to the image side of a diaphragm in order to separate further an exit pupil of the total system from an imaging plane as the variable magnification lens group is mounted.

4 Claims, 6 Drawing Figures

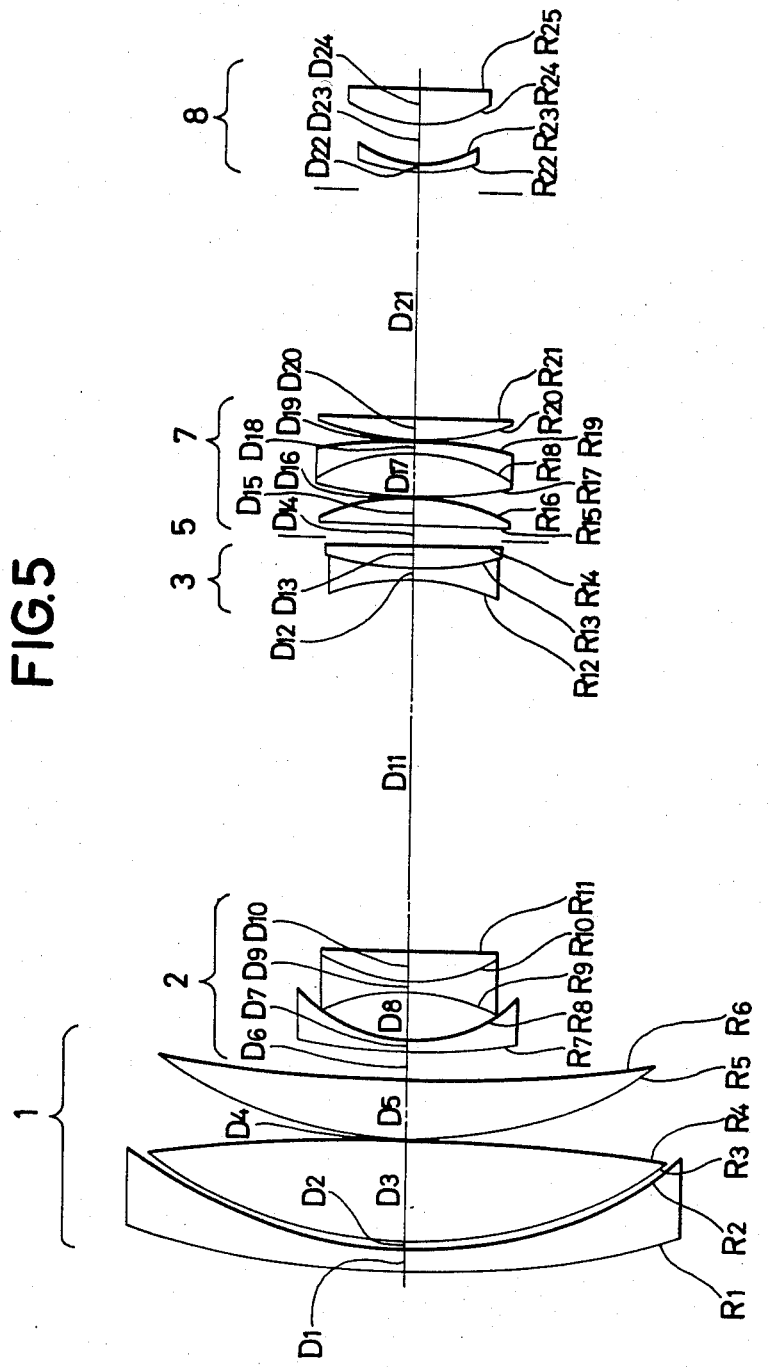

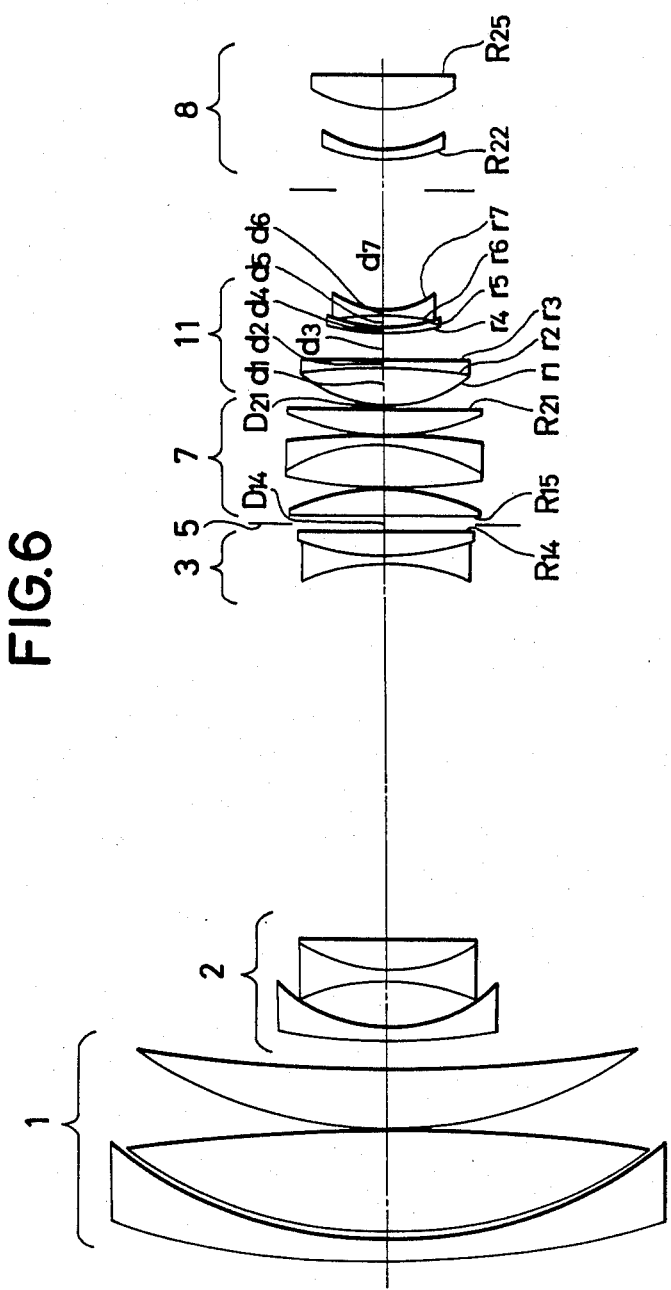

ZOOM LENS HAVING AN EASILY CHANGEABLE RANGE OF VARIABLE FOCAL DISTANCE

BACKGROUND OF THE INVENTION

The present invention relates to a zoom lens and, particularly, to an optical system which is suitable as a photographing lens for a television camera. The optical system can have a focal distance range which can be zoomed easily and changed by inserting a lens group for magnification variation into a basic zoom lens.

As a method for shifting a focal distance range of a zoom lens the following approaches have been known:

That is, (1) a so-called converter system to provide an afocal lens system in front of a zoom lens, an angular magnification of which afocal lens system is not 1, (2) a system to mount an attachment lens between a zoom lens and a camera main body, (3) a system to replace a relay part positioned at an imaging plane side in the rear of a zooming part of a zoom lens with another relay part having different focal distance, (4) a double zoom system containing a zoom system within a relay part, and (5) a system (Japanese Patent Application Sho 48-8118) to insert an attachment lens within a relay lens part consisting of two groups.

With respect to these systems, in the systems (1), (2) and (3) it is difficult to instantly change a focal distance, and a back focus of the total lens system can not be retained unchanged. Furthermore, a total lens length will vary. Also the system (4) results in a considerably long total length.

On the other hand, in a system of an attachment provided within a zoom lens system, which is the system (5), even if a total length of a basic zoom lens is a bit longer, the change of a focal distance can be done in an instant, and a back focus can be retained unchanged. Further, a total length of the zoom lens can be retained constant regardless of mounting or dismounting of an attachment lens. Also, the number of lenses used will be smaller than that in the system (4), thus cost will be less.

For such attachment lens system to be provided at an inside of a zoom lens, for example, as shown in "Optical Engineering" Vol. 15, No. 3, p. 231 to 235, two lens groups constituting a relay lens is fixed and a lens group to vary a focal distance is mounted between said two groups, thus changing the focal distance while retaining a back focus unchanged. However, when this kind of zoom lens is used as photographing lens for a color television, the exit pupil of the lens system will be too closely located to an imaging plane position in many cases. This constitutes great disadvantage with respect to shading for color television. That is, in a color television camera, a color separation optical system consisting of a dichroic mirror is placed in front of each image pick up tube. If the position of an exit pupil of a lens system is too close to an imaging plane, the difference in inclination of a light ray contained in the luminous flux impinging into said dichroic mirror becomes large. Therefore, the difference of the properties at a time when a light ray impinges into a dichroic mirror with a large angle of inclination and the properties at a time when the light ray impinges with a small angle of inclination becomes large. Therefore, if the exit pupil is separated away from the imaging plane, the difference in the inclination angle of incidence is lightened and shading is improved.

SUMMARY OF THE INVENTION

It is an object of the present invention to avoid the shading phenomenon in a zoom lens containing an attachment lens. To this end, the present invention is to provide a zoom lens to separate an exit pupil of a total lens system away from an imaging plane when an attachment lens is mounted. An arrangement of a zoom lens to achieve the object is to place, in an order to be given from an object side, a focusing lens part for focusing, a zooming part consisting of a plurality of movable lens groups to vary a focal distance, and an image forming lens part. The image forming lens part consists of a front lens group and a rear lens group and an attachment lens can be mounted at and dismounted from a position between said two lens groups. When the attachment lens is mounted on an optical axis between the front lens group and the rear lens group, a portion of lenses positioned closer to an imaging plane side than a diaphragm is shifted on the optical axis along the axis, so that the position of an exit pupil of a total lens system is separated away from an imaging plane.

Generally speaking, since a position of a diaphragm is provided between a zooming part and an image forming lens part in a zoom lens as in an example to be described below, when the attachment lens is mounted, a lens constituting an image forming lens part is shifted along an optical axis.

BRIEF DESCRIPTION OF THE DRAWINGS

FIG. 5 and FIG. 6 are cross-sectional views of lenses showing an example of a zoom lens according to the present invention; wherein FIG. 5 is a view to show a condition before an attachment lens is mounted, while FIG. 6 is a view to show a condition after an attachment lens is mounted.

DESCRIPTION OF THE PREFERRED EMBODIMENT

Figure 1:
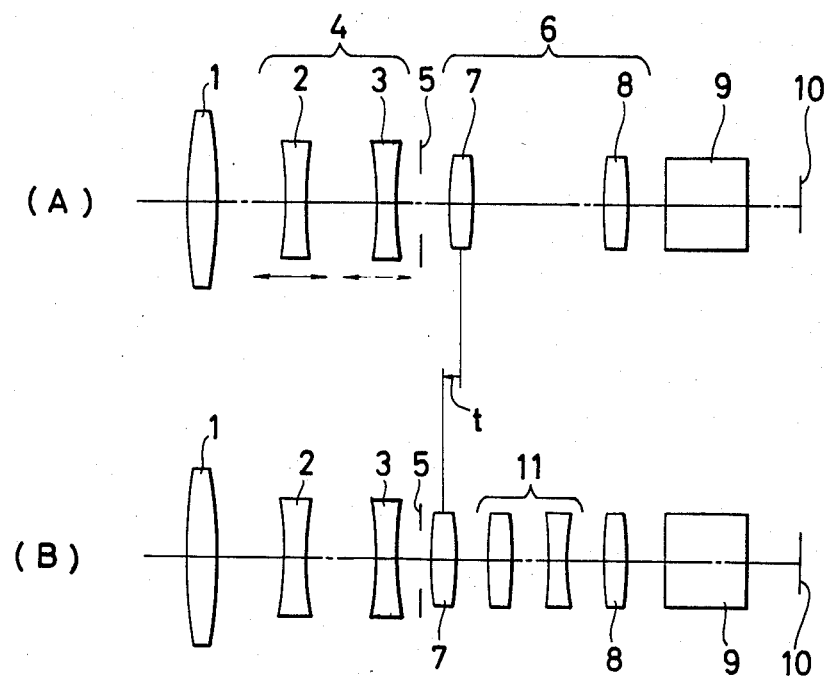
FIG. 1A and FIG. 1B are sketches to explain an example of a zoom lens according to the present invention.

FIG. 1A and FIG 1B are sketches to provide explanation of an example of a zoom lens according to the present invention. FIG. 1A corresponds to FIG. 5 showing a concrete example to be described below, while FIG. 1B corresponds to FIG. 6. In FIG. 1A and FIG. 1B, which is shown as 1 is a focusing lens part. What is shown as 2 is a variator, and which is shown as 3 is a compensator and these movable lens groups constitute a zooming part 4 in this invention. What is shown as 5 is a diaphragm and 6 is an image forming lens part, consisting of a front lens group 7 and a rear lens group 8. What is shown as 9 is a tricolor separation system, and 10 is an imaging plane. FIG. 1B shows a manner to mount an attachment lens. Here a front group 7 is shifted along an optical axis to an object side by a distance as much as t. Thus, when an attachment lens 11 is mounted, the position of an exit pupil of a zoom lens system is brought as close to an object as possible by shifting the front lens group 7. Now a further detailed optical analysis will be made with respect to an example 1 shown in FIG. 1A and FIG. 1B using FIG. 2A, and FIG. 2B.

Figure 2:
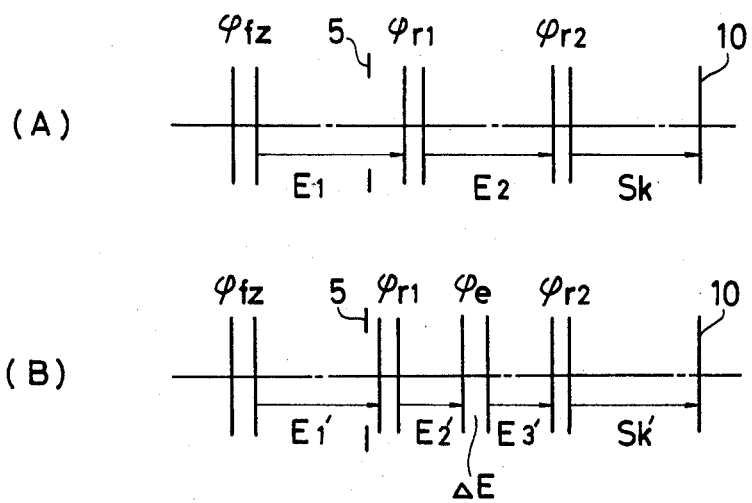
FIG. 2A and FIG. 2B are diagrams to explain an optical arrangement of a zoom lens shown in FIG. 1A and FIG. 1B.

FIG. 2A and FIG. 2B are for showing a basic optical arrangement and explanations will be made with respect to an optical positional relationship within a Gaussian zone in a zoom lens according to the present invention, following said arrangement shown in FIGS. 2A and 2B. Also, FIG. 2A corresponds to FIG. 1A, while FIG. 2B corresponds to FIG. 1B. In the drawings, solid lines drawn in perpendicular to an optical axis (one dot chain line) show a principal plane in each of blocks.

A mark $\phi fz$ shows power of the focusing part 1 made at an infinite state and of a zooming part 4 at a certain zooming position combined (inverse number of focal distance), $\phi r_1$ shows the power of the front group 7, and $\phi r_2$ shows power of the rear group 8, while $\phi e$ shows the power of the variable magnification lens group 11. $E_1$ designates the distance between a rear principal point of a lens system (1 and 4) which is a combined focussing part and zooming part, and a front principal point of the front group 7 when an attachment lens is not mounted and $E_2$ is a distance between a rear principal point of the front group 7 and a front principal point of the rear group 8, while Sk is a distance between a rear principal point of the rear group 8 and the imaging plane 10. What is expressed as $E_1'$ is a distance between the rear principal point of a lens system (1 and 4) positioned closer to an object side than the diaphragm when the attachment lens group is mounted and the front principal point of the front group 7, while $E_2'$ is a distance between the rear principal point of the front group 7 and the front principal point of the attachment lens. What is shown as $E_3'$ is a distance between the rear principal point of the attachment lens and the front principal point of the rear group 8, and $\Delta E$ is a distance between principal points of the attachment lens; while $Sk'$ is a distance (back focus) between the rear principal point of the rear group 8 and the imaging plane 10 when the attachment is mounted. Also, a focusing part 1 in a zoom lens has the function of providing a constant object point (imaging point of the focusing part) against a zooming part with respect to any given object distance; further, the imaging point of the zooming part 4 is always formed at a constant position in any given zooming position. Therefore, here, the focusing part in a state focusing is performed at an infinite object point and the zooming part in any given zooming state can very well be handled as an integral part without causing any difficulties. The magnification of the change in a focal distance range is represented by m, and a focal distance of a total system without an attachment lens mounted thereon is represented by f. The focal distance of a total system when an attachment lens is mounted is expressed by f'. The condition to be satisfied by a lens system in the present invention will be as follows:

(1) a focal distance becomes m times greater (m>1)

$$f \cdot m = f'$$

(2) a back focus is unchanged $$Sk = Sk'$$

(3) a length of the total system is unchanged $$E_1' + E_2' + \Delta E + E_3' = E_1 + E_2$$

A focal distance f' and a back focus Sk' when an attachment lens is mounted are given by the following formulas $$f' = \frac{1}{[\phi fz, -E_1', \phi r_1, -E_2', \phi e, -E_3', \phi r_2]}$$

$$Sk' = [\phi fz, -E_1', \phi r_1, -E_2', \phi e, -E_3']f'$$

In the above, the symbol [ ] is a Gaussian Bracket. This symbol is used to designate the same meaning as is used in an ordinary technical books on lens designing or an article, "Gaussian Optics and Gaussian Brackets" written by Herzberger, in Journal of Optical Society of America, Vol. 33 (1943), pages 651 to 655.

When the amount of shifting of the front group 7, $t = (E_1 - E_1')$ and the principal point distance $\Delta E$ of the attachment lens are supposed to be known factors, $E_2'$, $E_3'$, $\phi e$ in the above formulas can be expressed as:

$$E_2' = L - (E_1' + \Delta E) - \frac{\alpha}{\alpha \cdot \phi r_2 - \beta}$$

$$E_3' = \frac{\alpha}{\alpha \phi r_2 - \beta}$$

$$\phi e = \frac{\alpha}{[\phi fz, -E_1', \phi r_1, -E_2'][-E_3']f \cdot m}$$

wherein $\alpha$, $\beta$, L used in the above formulas are:

$$\alpha = S'k - [\phi fz, -E_1', \phi r_1, (E_1' + \Delta E - L)]f \cdot m$$

$$\beta = 1 - [\phi fz, -E_1', \phi r_1, (E_1' + \Delta E - L), \phi r_2]f \cdot m$$

$$L = E_1 + E_2.$$

That is, a focal distance can be made m times larger while a back focus and a total length are retained unchanged, by shifting a front group only of a basic zoom lens as much as $t = (E_1 - E_1')$ toward a direction of diaphragm and by providing an attachment lens having power $\phi e$ and a principal point distance $\Delta E$ between said front group and a fixed rear group in a manner that a distance between a rear principal point of a front group and a front principal point of an attachment lens becomes $E_2'$ (that is a distance between a rear principal point of a variable magnification lens group and a front principal point of a rear group becomes $E_3'$).

Figure 3:
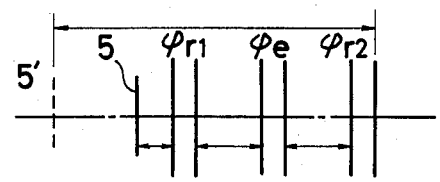
FIG. 3 is a diagram to explain an optical arrangement of a conventional zoom lens housing an attachment lens built therein.
Figure 4:
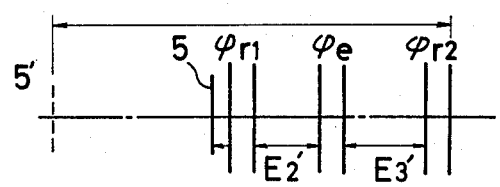
FIG. 4 is a diagram to explain an optical arrangement of a zoom lens according to the present invention.

A manner in which an exit pupil is separated further away from an imaging plane by adopting this arrangement will be reviewed on one line of figures using both FIG. 3 and FIG. 4.

FIG. 3 and FIG. 4 are diagrams to show a basic optical arrangement of a lens system placed closer to an imaging plane side than a diaphragm, wherein FIG. 3 shows a conventional built in attachment system, while FIG. 4 shows a built in attachment system according to the present invention. In an optical system shown in FIG. 4, when an attachment lens 11 is mounted, a front lens group 7 is shifted to an object side and the attachment lens 11 is also mounted at an object side, contrary to an optical system shown in FIG. 3. A position 5' of an exit pupil will be shown in Table 1, based on an assumption that power $\phi r_1$ of a front lens group $7 = 1/30$, power $\phi e$ of attachment lens $11 = 11/85$, and power $\phi r_2$ of rear lens group $8 = 1/60$.

Table 1

|  | Conventional system (FIG. 3) | A system of Present Invention (FIG. 4) |
|---|---|---|
| distance between a diaphragm 5 and a front principal plane of front lens group 7 | 4 | 2 |
| a principal point distance between front lens group 7 and attachment lens 11 | 64 | 64 |
| a principal point distance between attachment lens 11 and rear lens group 8 | 10.5 | 12.5 |
| a distance measured from rear principal plane of rear lens group 8 to exit pupil 5' | −252 | −288 |

As is apparent from Table 1, when an attachment lens 11 is mounted in a system according to the present invention the position of an exit pupil 5' of a total lens system is shifted to an object side compared to that in a conventional system.

FIG. 5 is directed toward an example of a zoom lens according to the present invention, and FIG. 6 is a diagram to show a condition in which an attachment lens is mounted on a zoom lens shown in FIG. 5. In a zoom lens shown in FIG. 5, surface $R_1$ to surface $R_6$ form a focusing lens part, and surface $R_7$ to surface $R_{14}$ form a zooming part, while surface $R_{15}$ to surface $R_{25}$ form an image forming lens part. Also, a diaphragm 5 is provided between a compensator lens 3 and a front lens group 7.

The power arrangement of a zoom lens shown in FIG. 6 will be shown first. Here, a focusing part 1 and a zooming part 4 are handled as an integral element as mentioned above.

|  |  | Focal distance | Front principal point | Rear principal point |
|---|---|---|---|---|
| Focusing part and zooming part |  | −11.649 | 49.547 | −27.064 |
| Front group of imaging lens part |  | 30.095 | 4.292 | −7.296 |
| Attachment lens |  | −85.132 | 56.778 | 26.213 |
| Rear group of imaging lens part |  | 59.241 | 11.623 | 1.535 |

The figure representing the front principal point of each lens part is a distance on an optical axis measured to a front principal point from a lens plane provided at a position closest to an object, determined from lenses constituting each lens group. The figure representing rear principal point is a distance on an optical axis measured to a rear principal point from a lens plane placed at a position closest to an imaging plane determined from lenses constituting each lens part. In measurement, those figures relating to the case when a position of principal point is placed closer to an imaging plane side than the reference lens plane are plus figures, while those figures in the case when the same is placed closer to an object side are minus figures. For example, a position of a front principal point of a front lens group 7 of an image forming lens is located at a position separated from the surface $R_{15}$ to an imaging plane side by 4.292 in a distance on the optical axis, and a position of a rear principal point is located at a position separated by 7.296 from the surface $R_{21}$ to the object side.

Lens data of a zoom lens shown in FIG. 5 in the case when a focal distance f of a total system is f=15.300 are shown below. The values of said $E_1$, $E_2$, Sk in this case are $E_1=33.855$, $E_2=60.019$ and Sk=19.401.

| R | D | Nd | Vd |
|---|---|---|---|
| 172.36 | 4.00 | 1.80518 | 25.40 |
| 77.73 | 1.20 | 1. |  |
| 78.88 | 17.00 | 1.60311 | 60.70 |
| −350.23 | 0.20 | 1. |  |
| 74.78 | 10.25 | 1.60311 | 60.70 |
| 280.66 | 0.82 | 1. |  |
| 138.98 | 1.50 | 1.71300 | 53.90 |
| 25.29 | 8.42 | 1. |  |
| −35.70 | 1.50 | 1.71300 | 53.90 |
| 27.17 | 5.00 | 1.80518 | 25.40 |
| 235.35 | 63.25 | 1. |  |
| −38.58 | 1.25 | 1.77250 | 49.70 |
| 50.59 | 4.00 | 1.80518 | 25.40 |
| −1267.41 | 3.50 | 1. |  |
| diaphragm |  |  |  |
| 911.99 | 4.75 | 1.77250 | 49.70 |
| −36.97 | 0.20 | 1. |  |
| 92.57 | 7.50 | 1.48749 | 70.10 |
| −30.19 | 1.50 | 1.80518 | 25.40 |
| −131.00 | 0.20 | 1. |  |
| 44.48 | 3.75 | 1.60311 | 60.70 |
| 374.88 | 38.10 | 1. |  |
| 29.47 | 4.50 | 1.80518 | 25.40 |
| 17.93 | 6.50 | 1. |  |
| 23.12 | 6.00 | 1.71300 | 53.90 |
| ∞ |  | 1. |  |

In the above table, R is a radius of curvature of a lens plane, and D is a distance on optical axis of a lens plane, while Nd is a refractive index, and Vd is a dispersion value.

Next, as shown in FIG. 6, when an attachment lens 11 is provided, a front lens group 7 is shifted by 1-mm to an object side. Data of the attachment lens ($r_1$ to $r_7$) will be represented below, but the values of the surfaces $R_1$ to $R_{13}$ are the same as the figures mentioned above, therefore they are omitted.

| R | D | Nd | Vd |
|---|---|---|---|
| −1267.41 | 2.50 | 1. |  |
| diaphragm |  | 1. |  |
| 911.99 | 4.75 | 1.77250 | 49.7 |
| −36.97 | 0.20 | 1. |  |
| 92.57 | 7.50 | 1.48749 | 70.1 |
| −30.19 | 1.50 | 1,80518 | 25.4 |
| −131.00 | 0.20 | 1. |  |
| 44.48 | 3.75 | 1.60311 | 60.7 |
| 374.88 | 0.75 | 1. |  |
| 22.696 $d_1$ = 6.60 |  | 1.58913 | 61.1 |
| −91.275 $d_2$ = 1.20 |  | 1.80518 | 25.4 |
| −383.950 $d_3$ = 4.47 |  | 1. |  |
| 46.621 $d_4$ = 1.00 |  | 1.60311 | 60.7 |
| 30.167 $d_5$ = 1.83 |  | 1. |  |
| −64.698 $d_6$ = 1.00 |  | 1.56873 | 63.1 |
| 14.947 $d_7$ = 19.85 |  | 1. |  |
| 29.47300 | 6.70 | 1.80518 | 25.4 |
| 17.93700 | 6.50 | 1. |  |
| 23.12400 | 6.00 | 1.71300 | 53.9 |
| ∞ |  | 1. |  |

The above mentioned $E_1'$, $E_2'$, $E_3'$, $\Delta E$, f', Sk' in the case when an attachment 11 shown in FIG. 6 is mounted are $E_1'=32.855$, $E_2'=66.385$, $E_3'=9.368$, $\Delta E=-14.987$, f'=23.533, Sk'=19.391. The position of an exit pupil in this example is 462.6 mm when an attachment lens is not mounted, and −319.5 mm when the same is mounted. However, the position of the exit pupil is a distance measured from a rear principal point of a rear lens group, wherein the minus indicates a case when the position is closer to an object side than the rear principal point. Also, the magnification m of the change in a focal distance range by mounting an attachment lens is $$m = 23.533/15.300 = 1.538.$$

What is claimed is:

1. A zoom lens adapted to have a range of a variable focal distance easily changed comprising:
   a focusing lens part;
   a zooming lens part which is positioned at an imaging plane side of said focusing lens part and consists of a plurality of movable lens group to vary a focal distance;
   an image forming lens part which consists of a front lens group and a rear lens group for imaging the luminous flux from said zooming part;
   a diaphragm positioned between said zooming lens part and said image forming part;
   an attachment lens provided in a freely insertable and removable manner at an optical path between said front lens group and rear lens group, a portion of the lenses of said front lens group and said rear lens group positioned closer to an imaging plane side of said diaphragm being shifted along a direction of the optical axis in response to the insertion of the attachment lens on an optical axis of said front lens group and said rear lens group, said portion of said lenses comprising means for separating the exit pupil of said zoom lens from said image plane in response to the insertion of said attachment lens.

2. A zoom lens according to claim 1, in which a front lens group of said image forming lens part is a movable lens shifted in a direction of the optical axis.

3. A zoom lens according to claim 2, in which said front lens group is shifted to an object side along optical axis when an attachment lens is mounted.

4. A zoom lens according to claim 3, in which said zoom lens satisfies the following formulas when the front lens group is shifted by $E_1 - E_1'$:

$$E_2' = L - (E_1' + \Delta E) - \frac{\alpha}{\alpha \cdot \phi_{r2} - \beta}$$

$$E_3' = \frac{\alpha}{\alpha \cdot \phi_{r2} - \beta}$$

-continued $$\phi e = \frac{\alpha}{[\phi fz, -E_1', \phi r_1, -E_2'] [-E_3'] f \cdot m}$$

$$\alpha = Sk - [\phi fz, -E_1', \phi r_1, (E_1' + \Delta E - L)] f \cdot m$$

$$\beta = 1 - [\phi fz, -E_1', \phi r_1, (E_1' + \Delta E - L), \phi r_2] f \cdot m$$

$$L = E_1 + E_2$$

wherein,
   m: magnification of the change in focal distance,
   $\phi fz$: power of a system made by combining a focusing lens part in a state in which focusing is performed at an object at infinite position and a zooming part at any given zooming position,
   $\phi r_1$: power of a front lens group,
   $\phi r_2$: power of a rear lens group,
   $\phi e$: power of attachment lens,
   $\Delta E$: a principal point distance of an attachment lens, and
   $E_1$, $E_2$, $Sk$ and $f$ are data of a zoom lens when an attachment lens is not mounted, and
   $E_1$: distance between a rear principal point of a lens system positioned closer to an object side than the front lens group and a front principal point of the front lens group,
   $E_2$: distance between a rear principal point of the front lens group and a front principal point of the rear lens group,
   $Sk$: a distance between a rear principal point of the rear lens group and an imaging plane,
   $f$: a focal distance of a total zoom lens system in a state in which the power of a system obtained by combining the focusing lens part and the zooming part satisfies fz, and
   $E_1'$, $E_2'$ and $E_3'$ are data of a zoom lens when an attachment lens is mounted, and
   $E_1'$: a distance between a rear principal point of a lens system positioned closer to an object side than the front lens group and a front principal point of the front lens group,
   $E_2'$: a distance between a rear principal point of the front lens group and a front principal point of the attachment lens, and
   $E_3'$: a distance between a rear principal point of the attachment lens and a front principal point of the rear lens group.

* * * * *